United States Patent [19]

Inoue et al.

[11] Patent Number: 5,992,331
[45] Date of Patent: Nov. 30, 1999

[54] TABLE FOR USE IN MOTOR VEHICLE ATTACHMENT STRUCTURE THEREFOR AND STRUCTURE OF A HOLDING ASSEMBLY FOR HOLDING A LID OPEN

[75] Inventors: Atsushi Inoue; Hidetsugu Okazaki; Masami Kawaguchi, all of Wako, Japan

[73] Assignee: Honda Giken Kogyo Kabushiki Kaisha, Tokyo, Japan

[21] Appl. No.: 08/722,930

[22] Filed: Sep. 30, 1996

[30] Foreign Application Priority Data

Oct. 6, 1995 [JP] Japan ................................. 7-260049
Oct. 6, 1995 [JP] Japan ................................. 7-260054

[51] Int. Cl.⁶ ................................................. A47B 37/00
[52] U.S. Cl. ........................... 108/44; 296/37.3; 108/90; 108/132
[58] Field of Search ................................ 296/37.3; 108/44, 108/18, 131, 50.12, 90, 125, 129, 130, 132, 38, 901, 25

[56] References Cited

U.S. PATENT DOCUMENTS

| | | | |
|---|---|---|---|
| 1,959,950 | 5/1934 | Friedlander | 108/90 |
| 2,267,444 | 12/1941 | Corduan et al. | 108/125 X |
| 2,643,926 | 6/1953 | Pucci | 108/131 |
| 2,774,643 | 12/1956 | Gladsden et al. | 108/131 |
| 3,338,620 | 8/1967 | Cauvin | 108/44 X |
| 4,494,465 | 1/1985 | Fick, Jr. | 108/44 |
| 4,951,576 | 8/1990 | Cobos et al. | 108/131 |
| 4,991,898 | 2/1991 | Nomura | 296/37.3 X |
| 5,050,926 | 9/1991 | Tanaka | 296/37.3 X |
| 5,080,417 | 1/1992 | Kanai | 296/37.3 |
| 5,090,335 | 2/1992 | Russell | 108/44 |
| 5,197,381 | 3/1993 | Mells | 108/44 |
| 5,383,411 | 1/1995 | Tomaka et al. | 108/132 X |
| 5,497,706 | 3/1996 | Yong | 108/129 X |
| 5,505,142 | 4/1996 | Fink | 108/129 |

FOREIGN PATENT DOCUMENTS

| | | | |
|---|---|---|---|
| 135347 | 7/1985 | Japan | 296/37.3 |
| 6247211 | 9/1994 | Japan | 296/37.3 |
| 23058 | 10/1908 | United Kingdom | 108/25 |

*Primary Examiner*—Janet M. Wilkens
*Attorney, Agent, or Firm*—Armstrong, Westerman, Hattori, McLeland & Naughton

[57] ABSTRACT

A table for use in a motor vehicle having a cargo room includes a top plate for use as a lid for the cargo room and legs pivotally mounted on the reverse side of the top plate. When the table is removed from the cargo room and the legs are projected from the top plate, the table is used as a table per se. The top plate can be closed with respect to the cargo room by a lock. A flexible tubular member is mounted on the reverse side of the top plate and extends away from the lock along the top plate. A string extends through the flexible tubular member and out of an opposite end thereof, and has an intermediate portion engaged by a holder on the reverse side of the top plate. The string has a distal end connected to a hook which is normally inserted and stored between the flexible tubular member and the top plate. The string is also stored on the reverse side of the top plate without being entangled by the lock.

11 Claims, 17 Drawing Sheets

TABLE FOR USE IN MOTOR VEHICLE ATTACHMENT STRUCTURE THEREFOR AND STRUCTURE OF A HOLDING ASSEMBLY FOR HOLDING A LID OPEN

BACKGROUND OF THE INVENTION

1. Field of the Invention

The present invention relates to a table for use as a lid for the cargo room of a motor vehicle, an attachment structure for such a table, and a structure of a holding assembly for holding the lid open.

2. Description of the Related Art

There has been a growing trend in recent years toward recreational activities using motor vehicles in suburban areas. Attention has been directed to recreational vehicles (RV) for use in such recreational activities.

Some recreational vehicles have a space positioned between rear seats and a rear window for placing a cargo therein. As shown in FIG. 17 of the accompanying drawings, a cargo room 2 is provided below such a space for storing a spare tire or other small articles, and a lid 4 is mounted over the cargo room 2.

Heretofore, a variety of different structures have been available for the lid 4. For example, one lid structure comprises a lid member molded of a synthetic resin by blow molding and iron pipes or the like inserted in a hollow space in the lid member. According to another lid construction, a plate-like lid is molded of a synthetic resin, and a reinforcing member is bonded to the peripheral edge of the lid member on its reverse side. Still another lid comprises a veneer with a reinforcing member bonded thereto. A further lid comprises a shaped iron sheet which is reinforced with a reinforcing frame.

The lid member molded of a synthetic resin by blow molding is disadvantageous because any region thereof for attachment of another component thereto needs to be pressed or otherwise processed and hence has a reduced mechanical strength. The lid member molded by blow molding has a relatively poor appearance and is not aesthetically appealing. The lid member molded of a synthetic resin or made of a veneer with a reinforcing member bonded thereto requires a tedious and time-consuming finishing process and a bonding process, and hence is relatively costly. The lid in the form of a shaped iron sheet is heavy and inconvenient to handle.

For removing a stored cargo from the cargo room 2 (see FIG. 17), the user opens the lid 4, holds the opened lid 4 with one hand, and then takes out the cargo with the other hand. Such a process is laborious and tiresome as both hands are occupied.

FIG. 18 of the accompanying drawings illustrates an improved lid structure in a recreational vehicle. As shown in FIG. 18, a string 6 with a hook 8 on one end thereof is connected to a lid 4 which is hinged to open and close a cargo room 2. When the lid 4 is opened, the hook 8 is engaged by an edge of the roof of the recreational vehicle. Since the lid 4 does not need to be kept open by hand, the user can use two hands to take a cargo into or out of the cargo room 2.

In order to keep the lid 4 in balance when it is opened, it is necessary that the string 6 be connected to the lid 4 in the vicinity of a lock 9 that is positioned centrally on a rear edge of the lid 4. Therefore, the string 6 tends to be entangled by the lock 9, preventing the lock 9 from locking or releasing the lid 4.

Another lid structure has a takeup mechanism for winding the string 6 to keep the string 6 from being entangled by the lock 9. However, the takeup mechanism adds to the cost of the lid structure.

According to another solution, the string 6 may be wound around a rod and then stored when the lid 4 is closed. It would, however, be tedious for the user to wind the string 6 around the rod, and the user might even forget to wind the string 6 around the rod when the lid 4 is closed. After the lid 4 is closed, the string 6 and the hook 8 may be removed and stored in a place spaced from the hook 8, so that the string 6 may not be entangled by the hook 8. This may pose another problem in that the user may forget about the stored hook 8 when the lid 4 is opened.

SUMMARY OF THE INVENTION

It is a general object of the present invention to provide a table for use in a motor vehicle and an attachment structure therefor which increase the mechanical strength of a lid for a cargo room, prevent the lid from wobbling, allow the lid to be handled with ease, and permit the lid to be used as a table with various functions.

Another general object of the present invention is to provide a structure of a holding assembly for holding a lid open, which allows a lid for a cargo room to be stored without causing a lock on the lid from malfunctioning and which is inexpensive to manufacture.

A major object of the present invention is to provide a table for use in a motor vehicle and an attachment structure therefor which have reinforcing ribs and legs on the reverse aside of a top plate that serves as a lid for a cargo room, the legs functioning as reinforcing members for the top plate when the legs are folded on the reverse side of the top plate in areas free of the reinforcing members, and as support legs for the top plate when the legs are projected from the reverse side of the top plate.

Another object of the present invention is to provide a table for use in a motor vehicle, which prevents water or other foreign matter from being trapped in a handle on a top plate of the table that serves as a lid for a cargo room of the motor vehicle.

Still another object of the present invention is to provide a table for use in a motor vehicle, which prevents a table cloth and/or bags from being displaced off a top plate of the table.

Yet still another object of the present invention is to provide a table for use in a motor vehicle, which has a highly reinforced top plate.

A still further object of the present invention is to provide a table for use in a motor vehicle, which is prevented from wobbling and producing noise when the table is stored in place in the motor vehicle.

A yet further object of the present invention is to provide a table for use in a motor vehicle, which prevents a top plate closed as a lid over a cargo room from wobbling and producing noise.

A yet still further object of the present invention is to provide a holding assembly for holding a lid open with respect to a cargo room, the holding assembly having a flexible tubular member connected to the lid near a lock for locking the lid closed with respect to the cargo room and extending away from the lock, a string inserted through the flexible tubular member, and a hook connected to an end of the string and normally inserted and stored between the flexible tubular member and the lid, the string being guided by the flexible tubular member to extend away from the lock so as to be prevented from being entangled by the lock.

Another object of the present invention is to provide a holding assembly for holding a lid open with respect to a cargo room, the holding assembly having a string connected to the lid and prevented from moving toward a lock for locking the lid closed with respect to the cargo room.

Still another object of the present invention is to provide a holding assembly for holding a lid open with respect to a cargo room, the holding assembly having a string connected to the lid and a holder for engaging the string to prevent the string from being entangled by a lock for locking the lid closed with respect to the cargo room.

The above and other objects, features, and advantages of the present invention will become apparent from the following description when taken in conjunction with the accompanying drawings in which a preferred embodiment of the present invention is shown by way of example.

DETAILED DESCRIPTION OF THE PREFERRED EMBODIMENT

Figure 1:
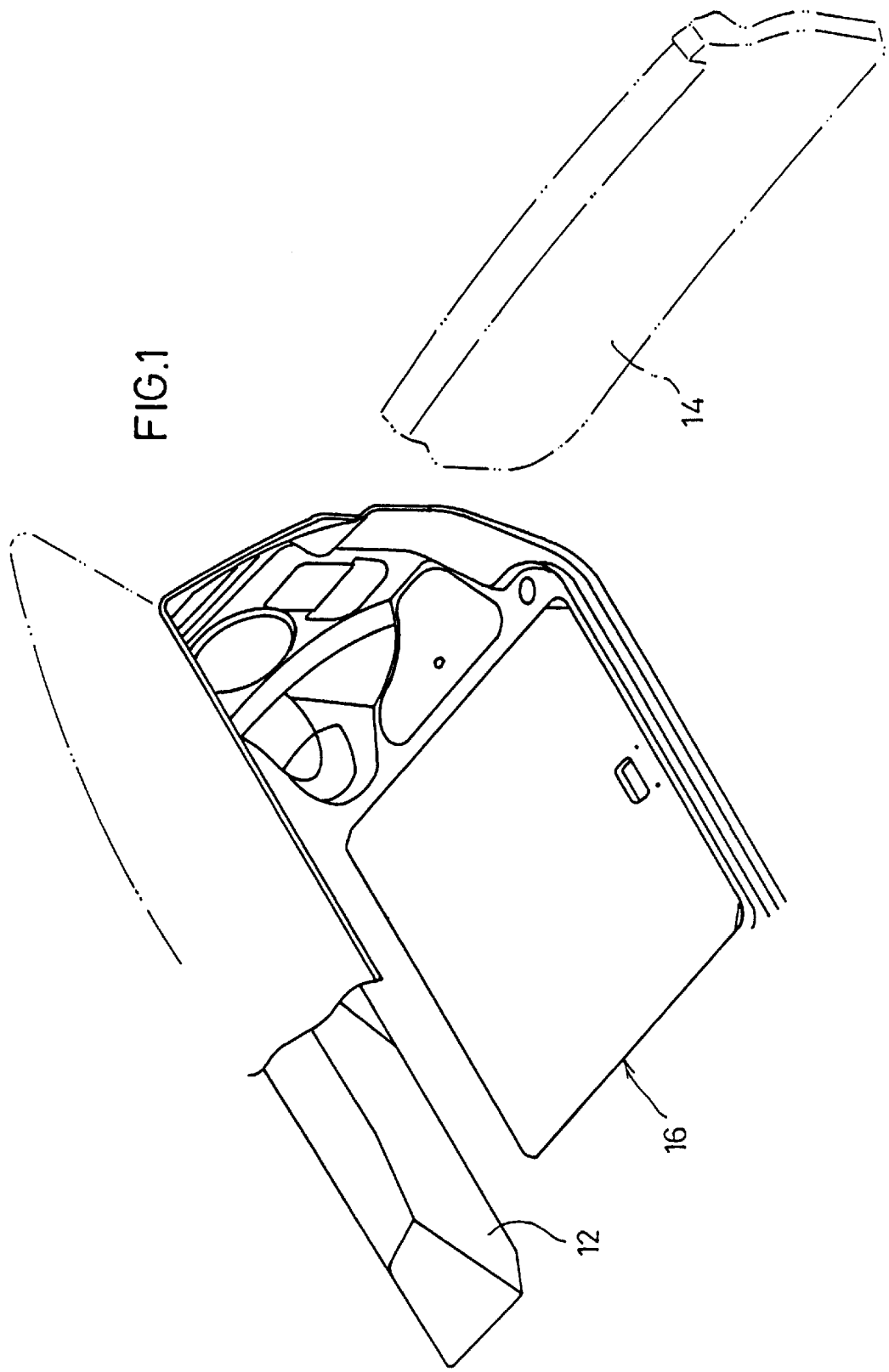
FIG. 1 is a perspective view of a table for use in a motor vehicle and an attachment structure therefor according to the present invention and a rear structure of the motor vehicle which incorporates a structure of a holding assembly for holding a lid open.
Figure 2:
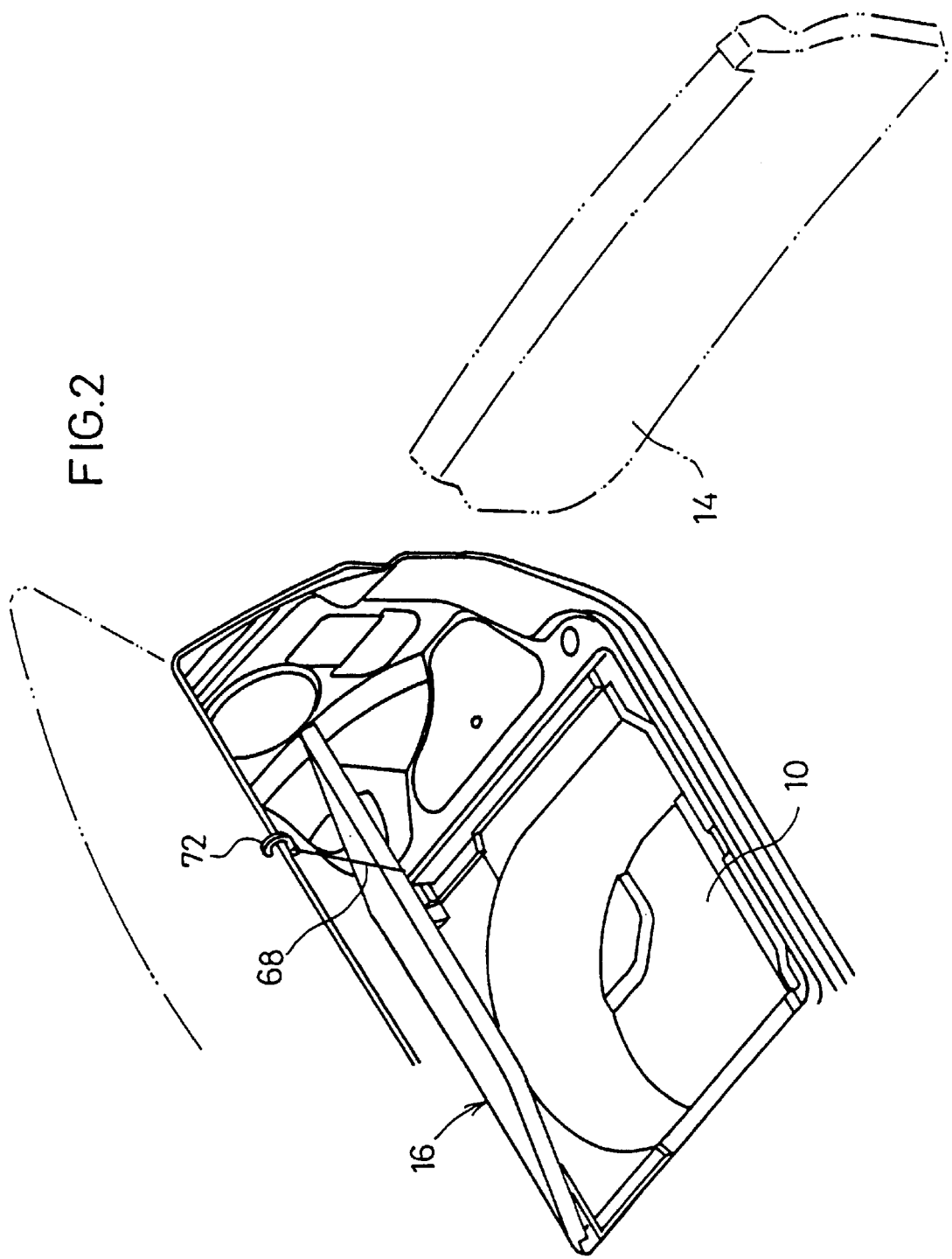
FIG. 2 is a perspective view showing the lid for a cargo room which is open.

FIGS. 1 and 2 show a table for use in a motor vehicle and an attachment structure therefor according to the present invention and a rear structure of the motor vehicle which incorporates a structure of a holding assembly for holding a lid open.

As shown in FIGS. 1 and 2, a cargo room 10 is positioned in a space between rear seats 12 and a tail gate 14 of a motor vehicle. The cargo room 10 can store a spare tire or other articles such as articles for use in leisure if a spare tire is mounted on an outside surface of the motor vehicle. A table 16 according to the present invention is placed as a lid over the cargo room 10.

Figure 3:
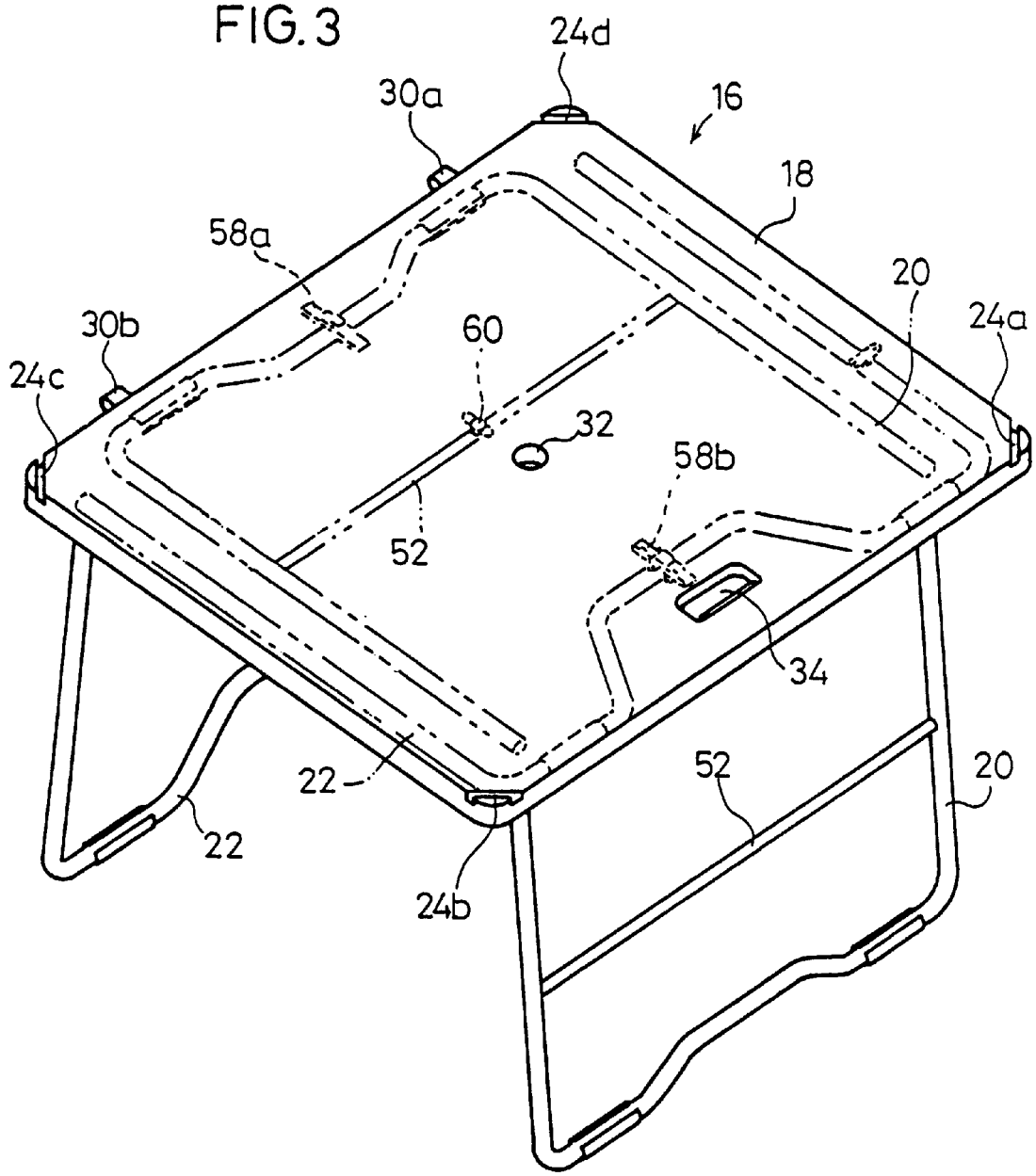
FIG. 3 is a perspective view of the table which is in use.

The table 16 is detachably positioned over the cargo room 10. As shown in FIG. 3, the table 16 basically comprises a top plate 18 and two legs 20, 22 mounted on the reverse side of the top plate 18.

Figure 4:
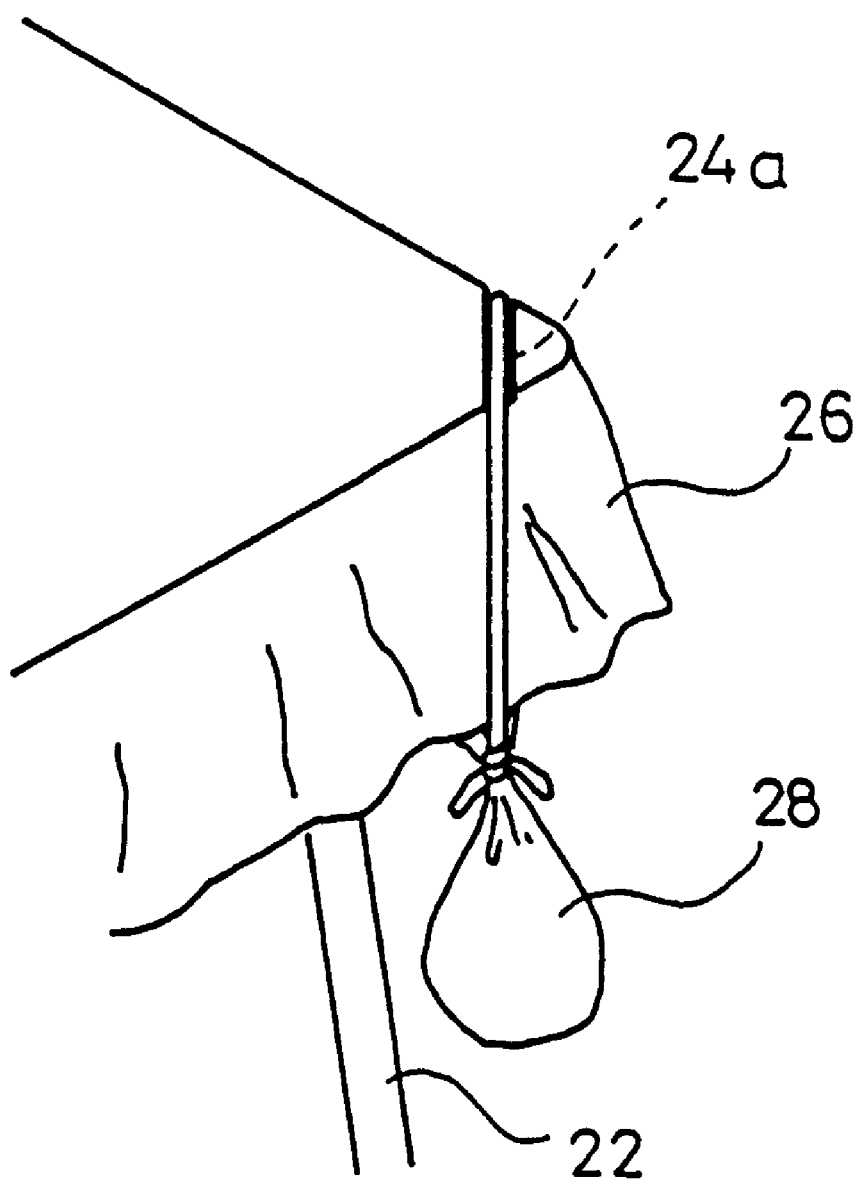
FIG. 4 is a fragmentary perspective view of the table covered with a table cloth.

The top plate 18 is of a square shape having grooves 24a~24d defined in respective corners thereof at its upper surface. As shown in FIG. 4, when the top plate 18 is covered with a table cloth 26, each of the grooves 24a~24d can receive a string connected to a bag 28 of sand or the like and wrapped by the table cloth 26.

As shown in FIG. 3, the top plate 18 has a pair of spaced teeth 30a, 30b projecting outwardly from one side edge thereof for engagement in respective openings defined in a front edge of the cargo room 10 near the rear seats 12. The top plate 18 also has a hole 32 defined centrally therein for receiving the lower end of the shaft of a parasol (not shown). The top plate 18 further has a handle 34 disposed in its upper surface near a side edge thereof opposite to the teeth 30a, 30b for opening the table 16, i.e., pivotally moving the table 16 away from the cargo room 10 about the teeth 30a, 30b. The handle 34 includes a rectangular opening 34a defined in the top plate 18.

Figure 5:
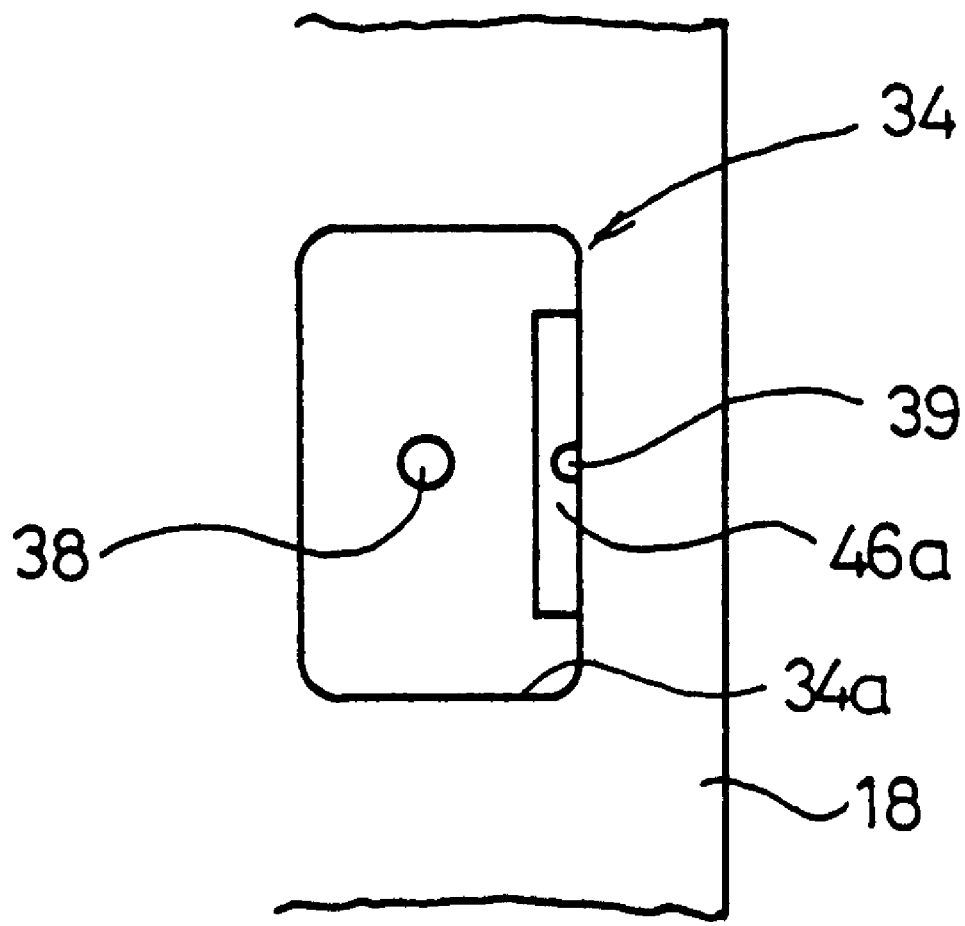
FIG. 5 is an enlarged fragmentary plan view of a handle of, the table.
Figure 6:
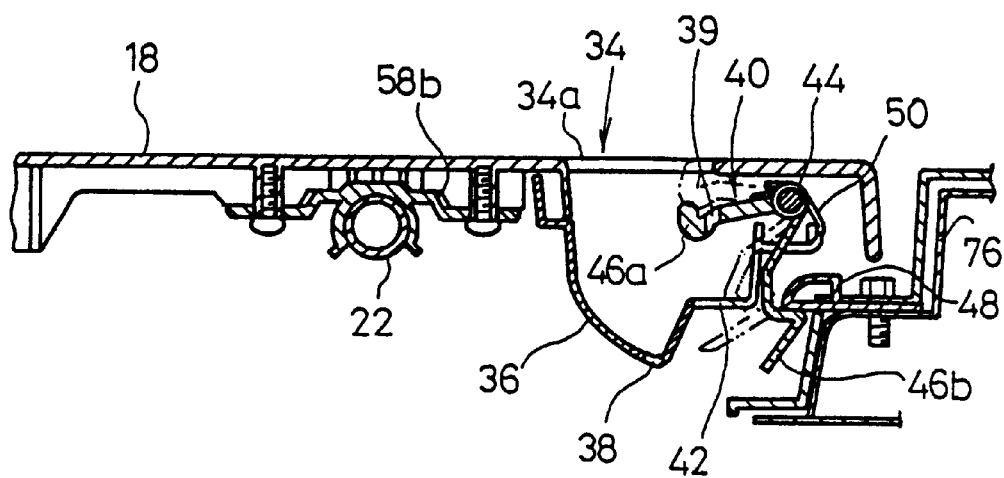
FIG. 6 is a fragmentary cross-sectional view of the handle of the table.

As shown in FIGS. 5 and 6, the handle 34 includes a bag-shaped cover 36 mounted on the reverse side of the top plate 18 below the rectangular opening 34a. The cover 16 has a through hole 38 defined therein for draining water or other foreign matter out of the cover 16. The cover 16 also has another hole 39. defined therein for receiving a portion of a lock 40 (lock means). The lock 40, which is supported on the top plate 18 by a pivot shaft 44, comprises a lever 46a mounted on the cover 36 and a lock finger 46b integrally joined to the lever 46a for engaging a catch 48 which is disposed in a rear end of the cargo room 10. The lever 46a has a hole 39 defined therein for draining water or other foreign matter from the lever 46a. The lock 40 is normally urged to turn the lock finger 46a into locking engagement with the catch 48 under the bias of a helical torsion spring 50 mounted on the pivot shaft 44.

Figure 7:
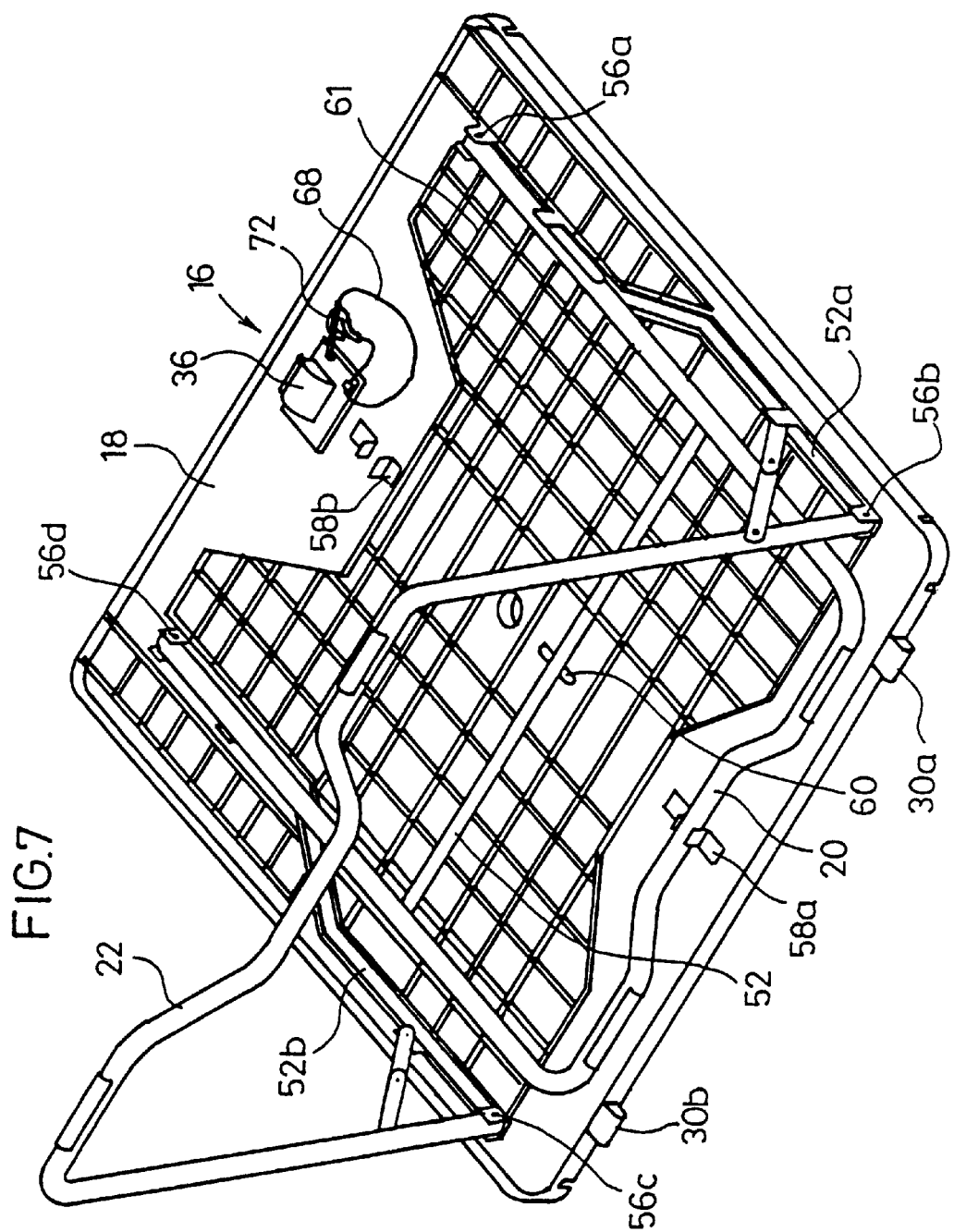
FIG. 7 is a perspective view showing the reverse side of the table.

As shown in FIG. 7, each of the legs 20, 22 comprises a substantially M-shaped pipe, and a reinforcing pipe 52 is connected to the leg 20. The legs 20, 22 are pivotally supported at ends thereof by pivot shafts 56a~56d on brackets 52a, 52b that are mounted on the reverse side of the top plate 18. When the legs 20, 22 are stored on, i.e., folded against, the top plate 18, intermediate portions of the legs 20, 22 are engaged and retained by respective retainers 58a, 58b mounted on the reverse side of the top plate 18, with the pipe 52 held in abutment against a damper 60 mounted on the reverse side of the top plate 18. The top plate 18 is reinforced by a grid-like pattern of reinforcing ribs 61 which are mounted on the reverse side of the top plate 18 except for areas where the legs 20, 22 are stored on the top plate 18.

Figure 8:
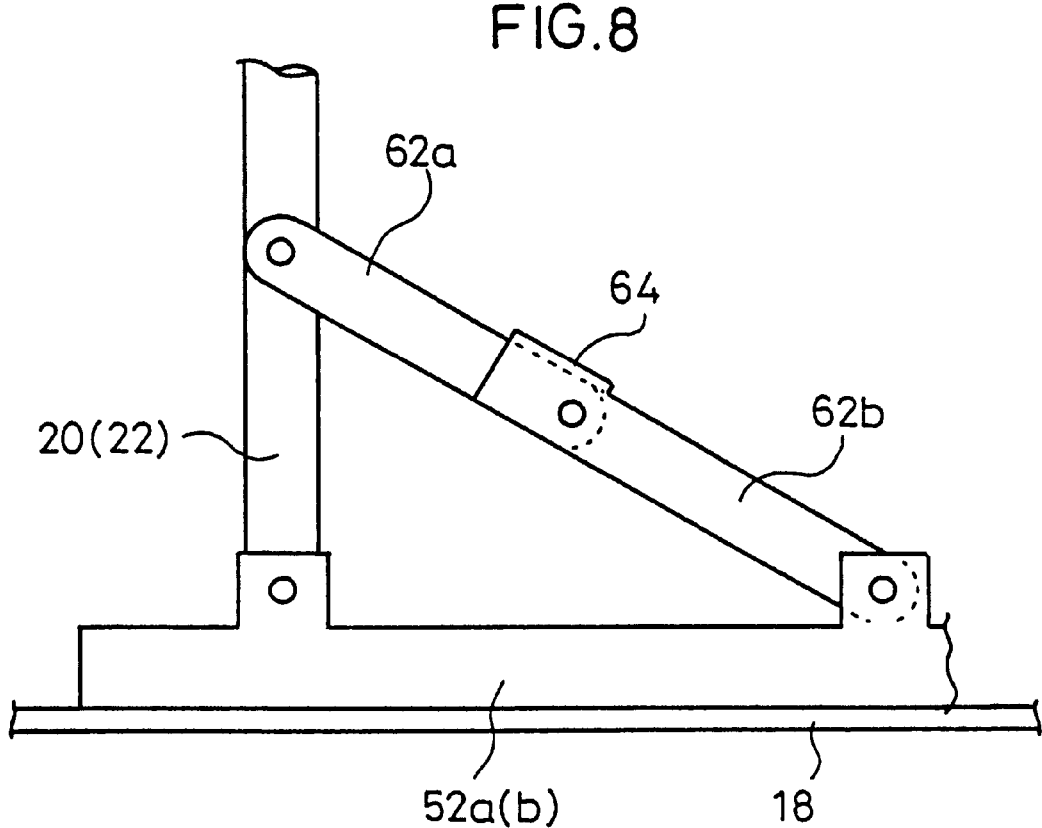
FIG. 8 is a fragmentary side elevational view of a support structure for a leg of the table.
Figure 9:
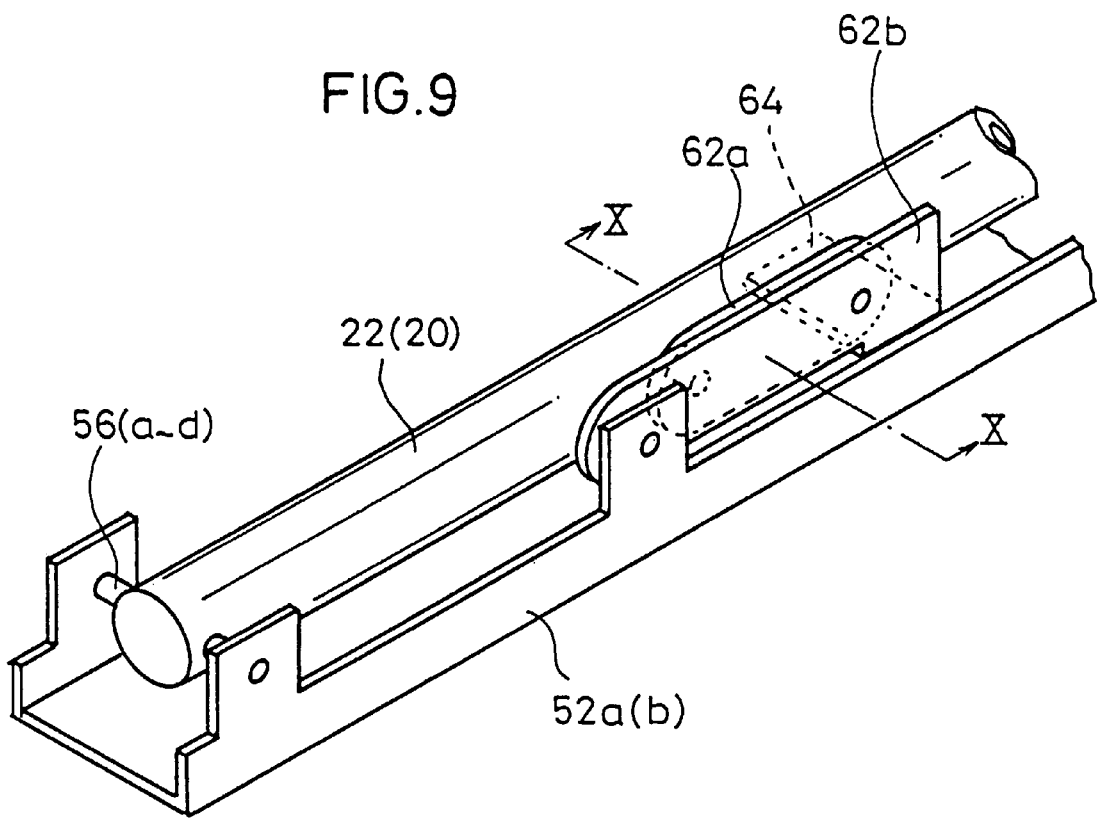
FIG. 9 is a fragmentary perspective view of the support structure shown in FIG. 8, with the leg folded.

When the legs 20, 22 are unfolded from, i.e., project from, the top plate 18, their pivoted ends are supported by respective pairs of links 62a, 62b as shown in FIG. 8. Specifically, the pairs of links 62a, 62b, which are pivotally joined to each other, pivotally interconnect the legs 20, 22 and the brackets 52a, 52b. When the legs 20, 22 are folded, the links 62a, 62b are pivotally folded into superposed relation to each other, as shown in FIG. 9. In each pair, the link 62b which is connected to the bracket 52a or 52b has a side plate 64 (see also FIGS. 9 and 10) on its end pivotally joined to the link 62a, the side plate 64 extending perpendicularly to the links 62a, 62b for limiting the links 62a, 62b against excessive angular movement beyond the position shown in FIG. 8. When the legs 20, 22 are folded, as shown in FIG. 9, the side plate 64 is held against the bracket 52a or 52b.

Figure 11:
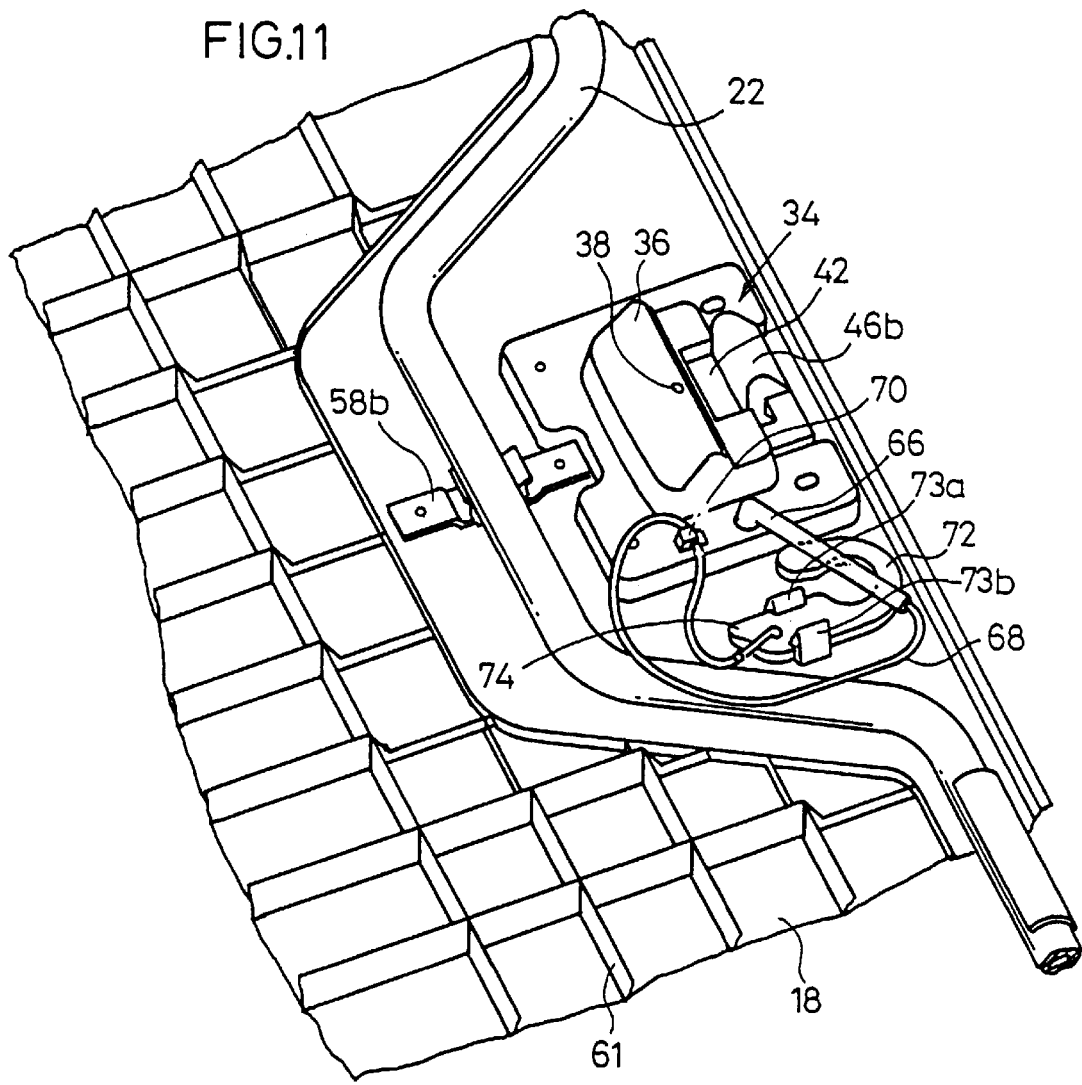
FIG. 11 is a fragmentary perspective view showing a handle and an attachment structure for a hook on the reverse side of the table.
Figure 12:
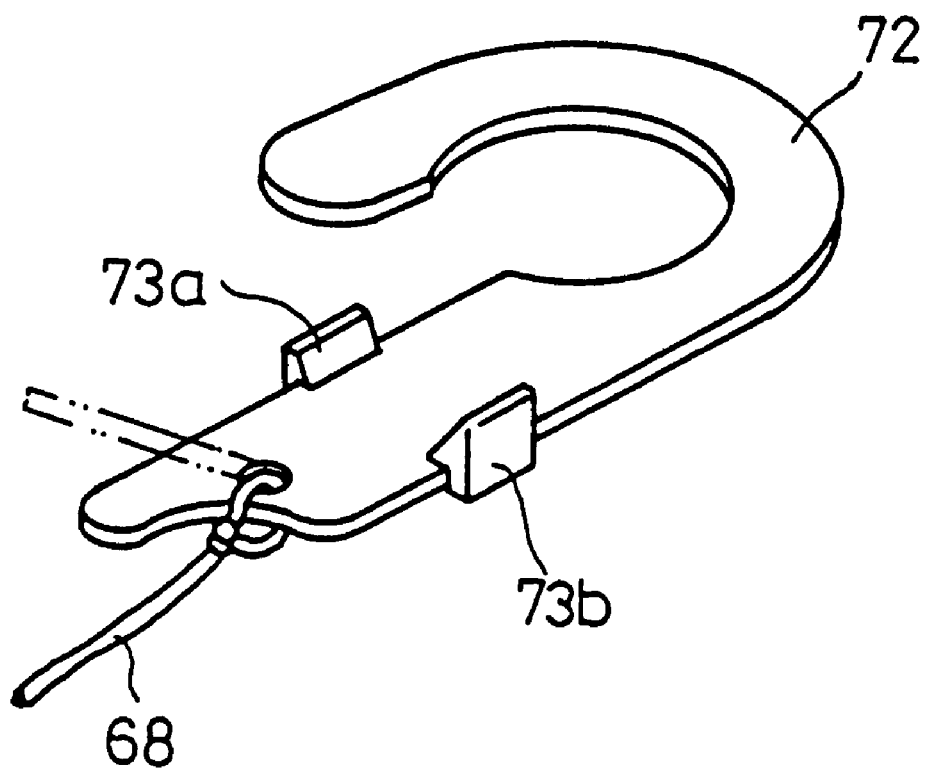
FIG. 12 is an enlarged perspective view of the hook shown in FIG. 11.
Figure 13:
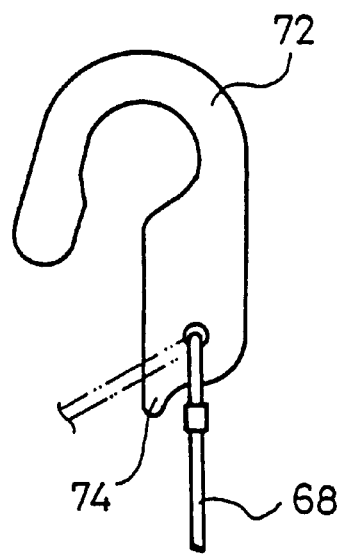
FIG. 13 is an enlarged plan view of the hook shown in FIG. 11.
Figure 14:
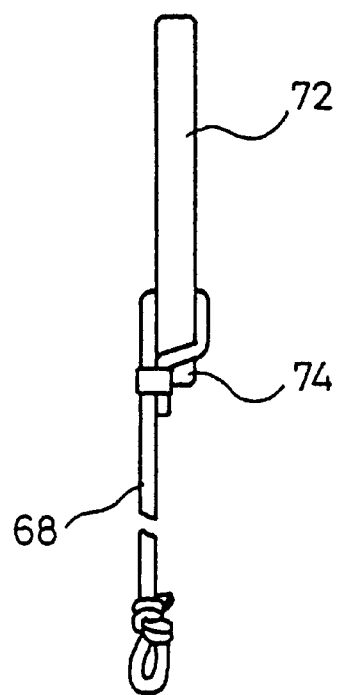
FIG. 14 is an enlarged side elevational view of the hook shown in FIG. 11.

As shown in FIG. 11, a tubular member 66 made of a flexible material such as rubber is connected to the cover 36 of the handle 34, and a string 68 is threaded through the tubular member 66. The tubular member 66 is guided by the tubular member 66 to extend in a direction away from the lock finger 46b of the lock 40. The string 68 has an intermediate portion thereof detachably engaged by a holder 70 mounted on the cover 36, and is connected to a hook 72 at its distal end. The holder 70 is of a substantially L-shaped cross section and is open rearwardly of the motor vehicle. As shown in FIGS. 12 through 14, the hook 72 has a substantially U-shaped end, and is normally held in position against the top plate 18 by a pair of teeth 73a, 73b mounted on the reverse side of the top plate 18 and the tubular member 66. The distal end of the string 68 is tied to an end of the hook 72 which is opposite to the substantially U-shaped end and which has a lobe 74 projecting away from the substantially U-shaped end. The hook 72 can be pulled out of engagement of the teeth 73a, 73b and the tubular member 66 in the rearward direction of the motor vehicle, in which the holder 70 is open.

Figure 15:
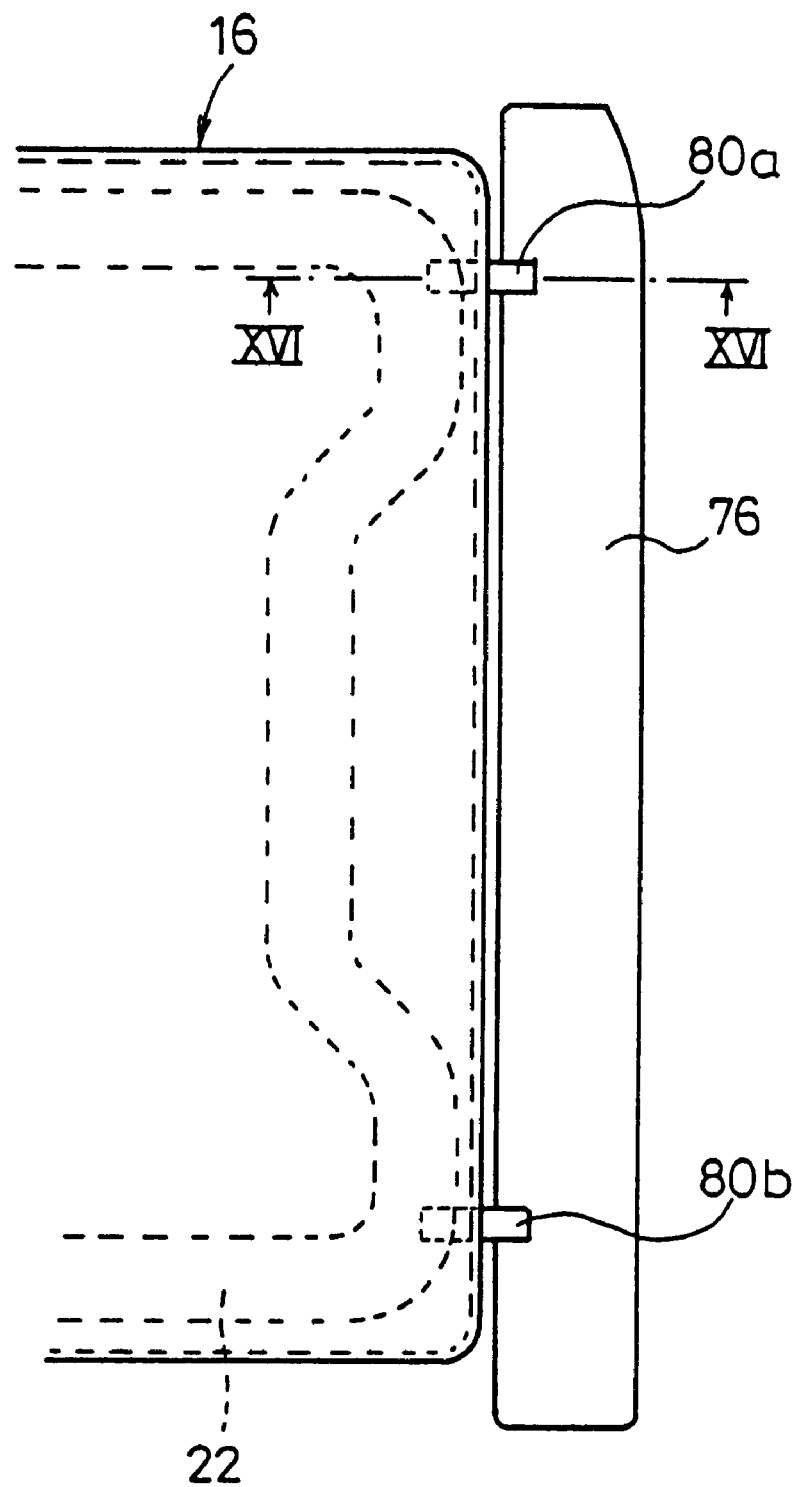
FIG. 15 is a fragmentary plan view of the attachment structure for the table.
Figure 16:
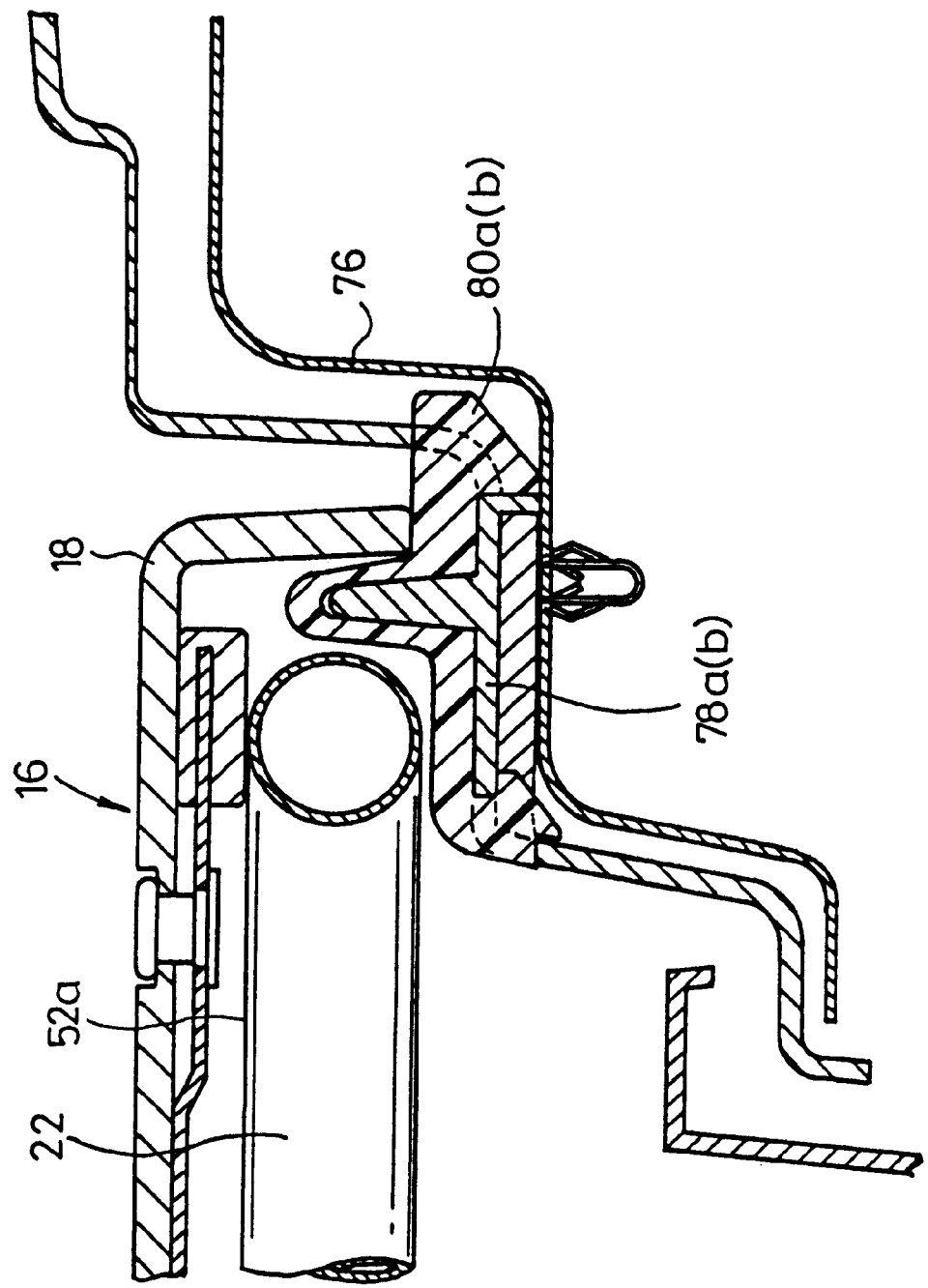
FIG. 16 is a cross-sectional view taken along line XVI—XVI of FIG. 15.
Figure 17:
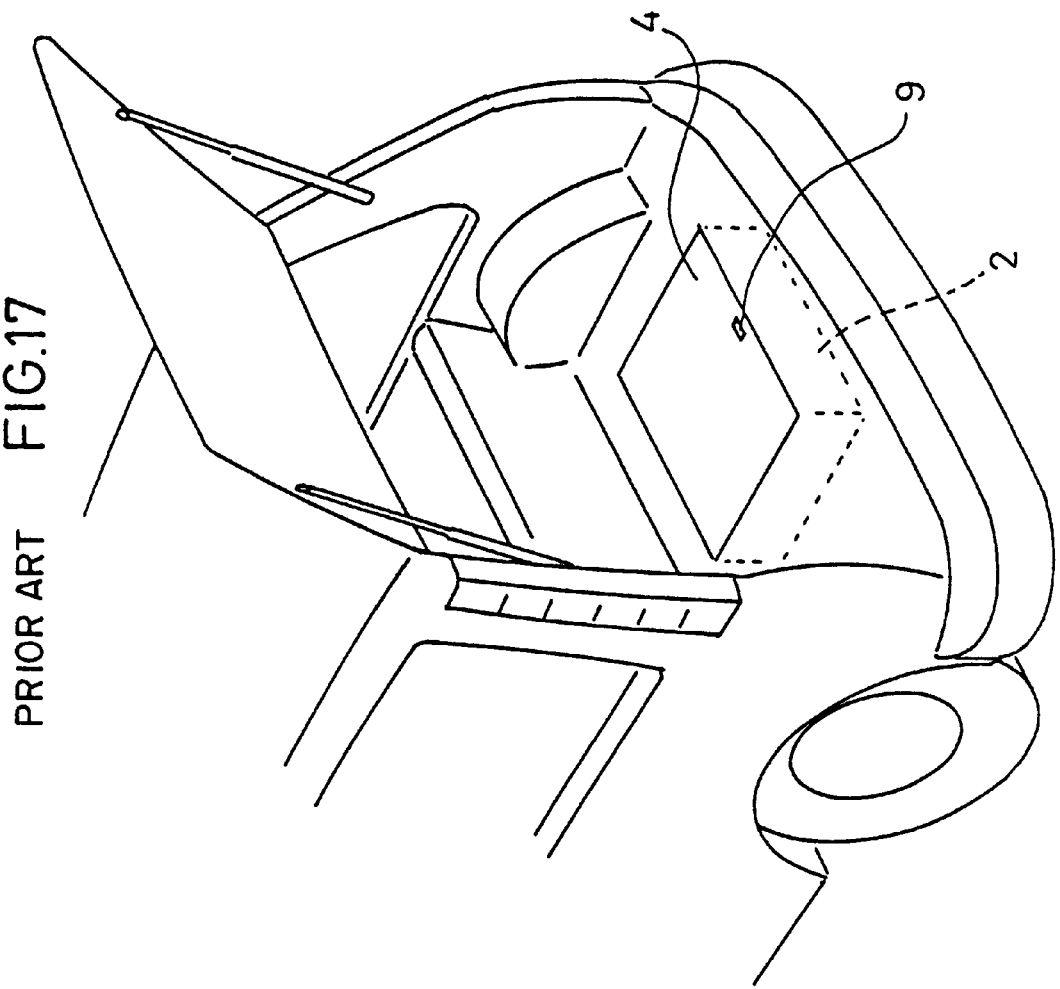
FIG. 17 is a fragmentary perspective view of a conventional cargo room in a recreational vehicle.
Figure 18:
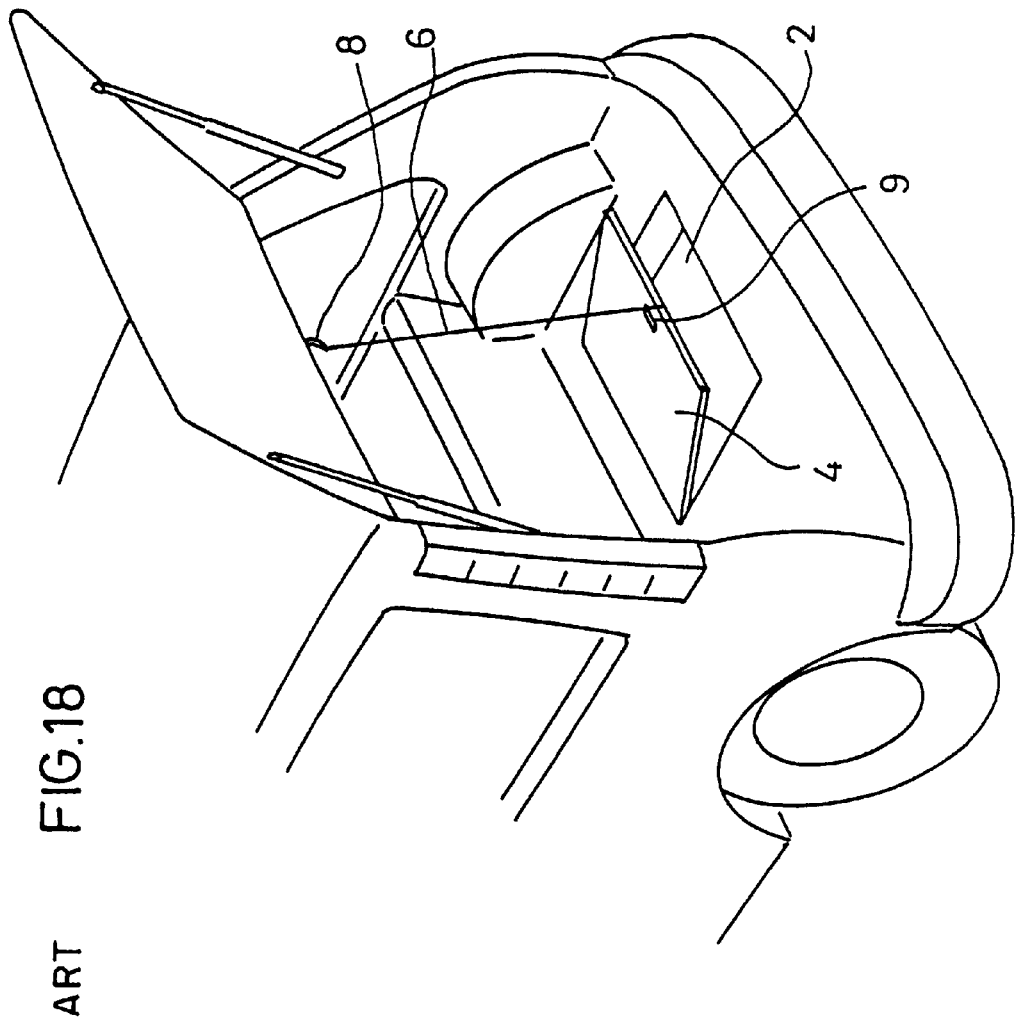
FIG. 18 is a fragmentary perspective view of a conventional cargo room, with a lid being open, in a recreational vehicle.

As shown in FIGS. 15 and 16, a pair of arms 78a, 78b is mounted on a floor 76 of the motor vehicle in the cargo room 10 near the tall gate 14. The arms 78a, 78b are covered with elastomeric covers 80a, 80b of rubber or the like. When the cargo room 10 is closed by the table 16, the arms 78a, 78b are positioned between the leg 22 and the rear edge of the top plate 18, as shown in FIG. 16.

Operation and advantages of the table 16, the attachment structure therefor, and the structure of the holding assembly for holding the lid open will be described below.

First, operation and advantages of the table 16 which is mounted in place in the motor vehicle will be described below.

When the table 16 is mounted in place in the motor vehicle, the teeth 30a, 30b on one side of the top plate 18 engage in the respective openings defined in the front edge of the cargo room 10, and the lock finger 46b of the lock 40 on the opposite edge of the top plate 18 engages the catch 48 which is mounted on the floor 76 in the rear end of the cargo room 10. Therefore, the cargo room 10 remains closed by the table 16 (see FIG. 6).

Since the ribs 61 are mounted on the reverse side of the top plate 18 and the legs 20, 22 and the pipe 52 are stored on the reverse side of the top plate 18, as shown in FIGS. 3 and 7, the top plate 18 is sufficiently strong when the cargo room 10 is closed by the table 16. The top plate 18 is made stiffened particularly because the legs 20, 22 are substantially M-shaped to effectively reinforce the top plate 18. Therefore, considerably heavy objects can be placed on the top plate 18. Since the top plate 18 is thus sufficiently reinforced, it may be molded of a light synthetic resin or the like, rather than a heavy material such as iron, in which case it can be handled with ease.

Figure 10:
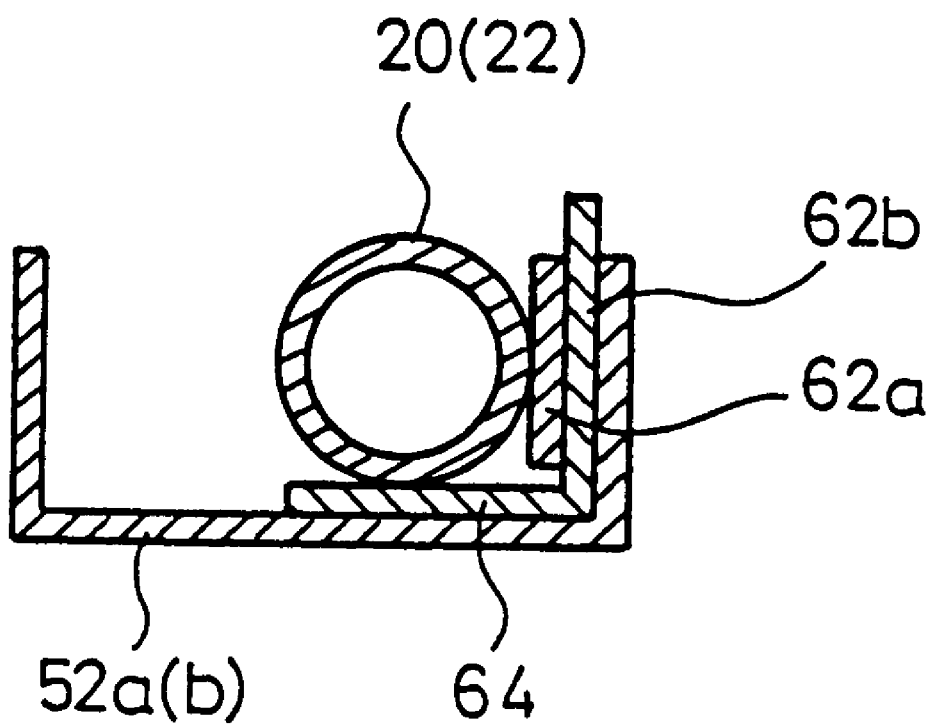
FIG. 10 is a cross-sectional view taken along line X—X of FIG. 9.

When the legs 20, 22 are folded, they are securely retained by the respective retainers 58a, 58b, and held in place by the links 62a, 62b which are folded as shown in FIGS. 9 and 10, with the side plates 64 held against the brackets 52a, 52b without projecting out. As shown in FIGS. 15 and 16, the arms 78a, 78b covered with the elastomeric covers 80a, 80b are positioned between the leg 22 and the rear edge of the top plate 18. At the same time, the teeth 30a, 30b engage in the respective openings in the front edge of the cargo room 10. Accordingly, the table 16 which is closing the cargo room 10 is securely held in position by the arms 78a, 76b and the teeth 30a, 30b against unwanted displacement in the fore-and-aft directions of the motor vehicle. Therefore, the legs 20, 22 and the top plate 18 neither wobble nor produce noise while the motor vehicle is running.

As shown in FIGS. 11 and 12, the hook 72 on the reverse side of the top plate 18 is sandwiched between the top plate 18 and the tubular member 66, and held in position by the teeth 73a, 73b, and the intermediate portion of the string 68 is held by the holder 70. Since the string 68 is guided by the tubular member 66 to extend in the direction away from the lock finger 46b, the string 68 will not inadvertently be positioned near the lock finger 46b. Inasmuch as the intermediate portion of the string 68 is held by the holder 70 and the lobe 74 projects from the end of the hook 72 to which the string 68 is tied, the string 68 is prevented by the lobe 74 from being displaced toward the lock finger 46b as indicated by the imaginary lines in FIGS. 12 and 13. Therefore, the string 68 will not be entangled by the lock finger 46b and hence will not interfere with a locking action of the lock finger 46b.

For removing a cargo from the cargo room 10, the user puts his hand into the rectangular opening 34a of the handle 34 and pulls the lever 46a, releasing the lock finger 46b out of engagement with the catch 48, as shown in FIG. 6, and then lifts the table 16 away from the cargo room 10.

To keep the table 16 lifted to hold the cargo room 10 open, the user removes the hook 72 from the reverse side of the top plate 18 in the rearward direction of the motor vehicle, and then engages the hook 72 on a rear edge of the roof of the motor vehicle, as shown in FIG. 2. The user now can use both hands to take the cargo from the cargo room 10. Since the intermediate portion of the string 68 has been engaged by the L-shaped holder 70 which opens in the rearward direction of the motor vehicle, the string 68 may be forcibly and smoothly pulled off the holder 70 without damaging the holder 70 to remove the hook 72 from the reverse side of the top plate 18.

The tubular member 66, the string 68, and the hook 72 jointly make up a holding assembly for holding the table 16 open.

After the user has removed the cargo from the cargo room 10, the hook 72 and the string 68 are stored in place as shown in FIGS. 11 and 12. Specifically, the U-shaped end of the hook 72 is inserted below the flexible tubular member 66, and an intermediate portion of the hook 72 is retained by the teeth 73a, 73b. The intermediate portion of the string 68 is engaged by the holder 70. Inasmuch as the lobe 74 projects from the end of the hook 72 to which the string 68 is tied, the string 68 is prevented by the lobe 74 from being displaced toward the lock finger 46b as indicated by the imaginary lines in FIGS. 12 and 13. Therefore, the string 68 will not be entangled by the lock finger 46b and hence will not interfere with a locking action of the lock finger 46b.

The table 16 is removed from the motor vehicle and used as a table per se as follows.

The user releases the lock finger 46b from the catch 48, and removes the table 16 from the motor vehicle. The user then unfolds the legs 20, 22 about the pivot shafts 56a 56d to project outwardly from the top plate 18, and places the table 16 on ground or the like as shown in FIG. 3. At this time, the links 62a, 62b pivotally joined between the legs 20, 22 and the top plate 18 support the legs 20, 22 on the top plate 18 as shown in FIG. 8. The legs 20, 22 may be securely held in a position projecting from the top plate 18 by pushing the side plates 64 toward the brackets 52a, 52b until the links 62a, 62b are substantially aligned with each other.

When the table 16 is placed as shown in FIG. 3, the lower end of the shaft of a parasol (not shown) may be inserted in the hole 32 defined centrally in the top plate 18 to spread the parasol over the top table 18.

Since the string 68 connected to the hook 72 held against the reverse side of the top plate 18 is guided by the tubular member 66 and engaged at its intermediate portion by the holder 70, the string 68 does not dangle from the reverse side of the top plate 18, making the table 16 look neat and aesthetically appealing.

As shown in FIGS. 5 and 6, the through hole 38 is defined in the cover 36. Therefore, even when water is spilled over the table 16 and enters the opening 34a of the handle 34, it is easily drained out th rough the hole 38 without being trapped in the handle 34. The hole 39 defined in the lever 34a is also effective to drain any water spilled over the lever 34a. Therefore, the spring 50 is not exposed to water, and is prevented from malfunctioning due to rust. The lock 40 is also prevented from being exposed to water and hence from failing to operate due to rust. Since the legs 20, 22 are substantially M-shaped, central portions thereof are kept out of contact with ground, and the legs 20, 22 can support the top plate 18 stably even when the table 16 is placed on an irregular ground surface.

The table 16 can also stably be placed on ground or the like by bags 28 of sand or the like which are connected to strings that are inserted in the respective grooves 24a~24d defined in the respective corners of the top plate 18. When the table 16 is covered with the table cloth 26 and the strings connected to the bags 28 and wrapped by the table cloth 26 are inserted in the grooves 24a~24d, the table cloth 26 can be held stably against the top plate 18, and hence the table cloth 26 and the bags 28 are prevented from being displaced off the table 16. Rather than the bags 28 of sand or the like, dust bags may be connected to the strings that are inserted in the respective grooves 24a~24d.

Although a certain preferred embodiment of the present invention has been shown and described in detail, it should be understood that various changes and modifications may be made therein without departing from the scope of the appended claims.

What is claimed is:

1. A table for use in a motor vehicle having a cargo room, comprising:

a top plate for use as a lid for said cargo room, wherein said top plate has a top side opposed to a reverse side;

a pattern of reinforcing ribs mounted on said reverse side of said top plate in areas thereof; and legs pivotally mounted on said reverse side of said top plate in other areas free of said reinforcing ribs, said legs when in a folded position being against said reverse side of said top plate, and said legs when not in said folded position being projected from said reverse side of said top plate for use as support legs for said top plate, wherein said top plate has grooves defined in respective corners thereof for receiving strings connected to bags, a table cloth, or both bags and a table cloth, each of said grooves being open laterally on two adjacent edges of said top plate.

2. A table for use in a motor vehicle having a cargo room, comprising:

a top plate for use as a lid for said cargo room;

legs pivotally mounted on a reverse side of said top plate;

lock means adapted for use with a catch of said cargo room of said motor vehicle for locking said top plate in a position such that said cargo room is closed; and a holding means adapted for use with a frame of said vehicle for holding said top plate in a position such that said cargo room is open, wherein said holding means is mounted on said reverse side of said top plate;

said holding means comprising:

a flexible tubular member having an end fixed near said lock means and extending away from said lock means along said top plate;

a string extending through said flexible tubular member and out of an opposite end thereof; and a hook having an end connected to a distal end of said string extending out of said flexible tubular member and normally inserted between said flexible tubular member and said top plate.

3. The table according to claim 2, wherein said hook has a lobe at said end thereof for preventing said string from being displaced toward said lock means.

4. The table according to claim 2, further comprising a holder mounted on said reverse side of said top plate for holding an intermediate portion of said string, said holder being open in a direction in which said string can be pulled off said top plate.

5. The table according to claim 2, further comprising teeth mounted on said reverse side of said top plate near said lock means for engaging said hook.

6. A cargo room in a motor vehicle comprising a table having a top plate for use as a lid for said cargo room, a rear edge of said top plate projecting downwardly from a reverse side of said top plate, and legs pivotally mounted on said reverse side of said top plate, and arm means for preventing movement of said top plate when said cargo room is closed by said top plate, wherein said arm means is mounted on a floor in said cargo room and protrudes upwardly, and said arm means, when said cargo room is closed by said top plate, is inserted between said rear edge of said top plate and a bottom portion of one of said legs which is folded against said reverse side of said top plate.

7. The cargo room according to claim 6, wherein said top plate of said table has teeth means, projecting from a front edge of said top plate opposite to said rear edge of said top plate for engagement with an edge of said cargo room for preventing said top plate from being moved when said cargo room is closed by said top plate.

8. A holding assembly mounted on a reverse side of a lid for a cargo room of a motor vehicle for holding said lid open, said lid having lock means adapted for use with a catch of said cargo room of said motor vehicle for locking said lid in a position such that said cargo room is closed, comprising:

a flexible tubular member having an end fixed near said lock means and extending away from said lock means along said lid;

a string extending through said flexible tubular member and out of an opposite end thereof; and a hook having an end connected to a distal end of said string extending out of said flexible tubular member and normally inserted between said flexible tubular member and said lid.

9. The holding assembly according to claim 8, wherein said hook has a lobe at said end thereof for preventing said string from being displaced toward said lock means.

10. The holding assembly according to claim 8, further comprising a holder mounted on said reverse side of said lid for holding an intermediate portion of said string, said holder being open in a direction in which said string can be pulled off said lid.

11. The holding assembly according to claim 8, further comprising teeth mounted on said reverse side of said lid near said lock means for engaging said hook.

* * * * *